United States Patent
Gillis (10) Patent No.: US 9,348,365 B2
(45) Date of Patent: May 24, 2016

(54) MODULAR COMPUTER UNITS

(71) Applicant: John Archie Gillis, Halifax (CA)

(72) Inventor: John Archie Gillis, Halifax (CA)

(*) Notice: Subject to any disclaimer, the term of this patent is extended or adjusted under 35 U.S.C. 154(b) by 0 days.

(21) Appl. No.: 14/086,850

(22) Filed: Nov. 21, 2013

(65) Prior Publication Data

US 2015/0138703 A1    May 21, 2015

Related U.S. Application Data

(60) Provisional application No. 61/729,385, filed on Nov. 22, 2012.

(51) Int. Cl.
*G06F 1/16* (2006.01)

(52) U.S. Cl.
CPC ............ *G06F 1/1626* (2013.01); *G06F 1/1654* (2013.01); *G06F 1/1656* (2013.01); *G06F 2200/1635* (2013.01)

(58) Field of Classification Search
CPC ....... G06F 1/18; G06F 1/1633; G06F 1/1601; G06F 1/1649; G06F 1/7896; H04N 1/00538
USPC ......... 439/39; 361/681, 679.04; 345/156, 1.3, 345/903, 1.1
See application file for complete search history.

(56) References Cited

U.S. PATENT DOCUMENTS

| | | | |
|---|---|---|---|
| 6,819,303 B1 * | 11/2004 | Berger ........................ | G09F 9/33 345/1.1 |
| 7,311,526 B2 * | 12/2007 | Rohrbach et al. ............... | 439/39 |
| 7,517,222 B2 * | 4/2009 | Rohrbach et al. ............... | 439/39 |
| 7,841,776 B2 * | 11/2010 | DiFonzo et al. ................ | 385/57 |
| 8,892,864 B2 | 11/2014 | Sainath et al. | |
| 8,898,447 B2 | 11/2014 | Sainath et al. | |
| 8,947,864 B2 | 2/2015 | Whitt, III et al. | |
| 8,988,876 B2 | 3/2015 | Corbin et al. | |
| 2004/0233176 A1 * | 11/2004 | Denq et al. ..................... | 345/173 |
| 2005/0270730 A1 * | 12/2005 | Klushin et al. ................. | 361/681 |
| 2007/0072443 A1 * | 3/2007 | Rohrbach .......... | H01R 13/6205 439/39 |
| 2009/0100732 A1 * | 4/2009 | Seidler ............................ | 40/729 |
| 2010/0116961 A1 * | 5/2010 | Moscovitch ................... | 248/371 |
| 2012/0194448 A1 | 8/2012 | Rothkopf | |
| 2013/0009852 A1 * | 1/2013 | Moscovitch .......... | G06F 1/1601 345/1.1 |
| 2013/0027422 A1 * | 1/2013 | Kennedy ....................... | 345/619 |
| 2013/0082919 A1 * | 4/2013 | Jano ..................... | H04M 1/0208 345/156 |
| 2013/0100013 A1 * | 4/2013 | Lee ............................... | 345/156 |

* cited by examiner

*Primary Examiner* — Jayprakash N Gandhi
*Assistant Examiner* — Stephen Sul
(74) *Attorney, Agent, or Firm* — Panovia Group LLP (57) ABSTRACT

The present invention describes a modular computerized system that includes the ability to magnetically attach to another similar or identical unit, integrates both male and female ports into each unit so that when two or more units are attached side by side the ports become functional and do not require external cables. Other elements of the invention include; the integration of one or more data splitters into the computerized unit and the integration of one or more power splitters into the computerized unit. The present invention also provides the ability to charge more than one computerized unit with only one cable attachment and the ability to share data quickly and easily between more than one computerized unit without the use of cables unless desired.

13 Claims, 9 Drawing Sheets

MODULAR COMPUTER UNITS

CROSS-REFERENCE TO RELATED APPLICATIONS

This application claims the benefit under 35 U.S.C. §119 (e) of U.S. Provisional Application 61/729,385, filed Nov. 22, 2012, and entitled Modular Computer Units, which is hereby incorporated herein by reference.

FEDERALLY SPONSORED RESEARCH

Not Applicable

SEQUENCE LISTING OR PROGRAM

Not Applicable

BACKGROUND OF THE INVENTION

1. Field of Invention

The present invention relates to modular computer components and systems.

2. Prior Art

The present invention relates to modular computer components and systems. Most computer units include a visual display that is based on LED or LCD technology. Many are all-in-one units, such as the iMac, iPad, iPhone, Android, Blackberry, Samsung Galaxy Tab, BlackBerry PlayBook, Cisco Cius HP Slate 500, Toshiba Libretto, ViewSonic ViewPad 100, ASUS Eee Pad, Lenovo IdeaPad U1Hybrid, Archos 10.1, Toshiba Folio 100, LG Android tablet, MSI WindPad 100, Notion Ink Adam, NEC LifeTouch, ExoPC Slate, Motion J3500, Viliv X70 EX, Nefonie WeTab, Augen Gentouch78, etc., but other computing devices are made up of separate and/or changeable components that include keyboards, monitors, input devices, etc. In some instances the computerized units do not have a visual display and focus on audio output, such as a musical instrument effects pedal.

Computer units with their integrated displays are often set up for screen sharing by networking or attaching the display units together via a cable. One of the problems with this method of screen sharing is that current computer screens have large edges. Due to these large edges, it is more common that shared or multiple displays shows different content or tile the content, so that all the monitor displays look the same. If more than one monitor is used to display one picture over numerous displays, the monitor edges greatly interrupt the visually displayed content as current display units have a border around the screen portion, which creates gaps in the pictures when set up beside each other. We see this when a number of computer display units are set up beside each other. This is the likely reason for the limited popularity of these systems and methods.

Another existing problem with collective computer displays is that although some computer units and their integrated displays can be set up beside each other in a number of different ways, to potentially display related content, they generally require an external means of attachment. An example of one of these systems is the Foldable System for Supporting Multiple Computer Monitors found in United States Published Application No. 2010/0116961 to Moscovitch. These types of systems are unfortunately not integrated into the display units and are sold as separate components to the display screen.

It has been determined that there is a need in the art for a display unit that can quickly and easily attach or assist with the attachment of one computer display unit with one or more other computer display units. It has been determined that in the preferred embodiment of the present invention that the method for attachment of the one or more display units be integrated into the units themselves.

Another drawback of current computer display systems is that a cable is required to attach one visual display unit to another, thus if someone wants to try and place more than one display unit together to watch content on multiple displays, the cables get in the way, need to be plugged into the devices and are an extra annoyance. Cords coming from the ports of many systems will not allow the close proximity of many devices. A great example of this is the MacBook Pro. If I wanted to watch content on two separate screens of a set of MacBook Pros, the cable for connecting the two devices would be very troublesome and get in the way of the picture and prevent the computers from being as close as possible to each other. The bezels would be problematic and so would the cables.

No computer units presently manufactured are capable of magnetically attaching themselves to another unit of a similar nature for modular screen creation. They are designed to be stand alone devices rather than components of a larger modular system.

The present invention also provides a method for creating hard-wired communication between devices but with a cable free environment. The date transfer between devices can be as fast as telephone networks, cable television, fiber-optic communication or waveguide, but can be achieved by placing the two or more devices beside each other, essentially plugging themselves directly into each other.

The present invention will also allow for power or energy from one device to be transferred to another similar device. This could be very useful if your cell phone was dead, but you really needed to retrieve data from it. You could use a friends device to power your device long enough to get the required information or even charge up your device from theirs. Another benefit of the present invention is that one cable can be used to charge multiple devices, which can save on plug usage.

An interesting device described in U.S. Pat. No. 7,311,526 to Rohrbach, et al. ("Rohrbach") describes a magnetic connector for an electronic device. An electrical plug and receptacle relying on magnetic force to maintain contact are disclosed. The plug and receptacle can be used as part of a power adapter for connecting an electronic device, such as a laptop computer, to a power supply. The plug includes electrical contacts, which are preferably biased toward corresponding contacts on the receptacle. The plug and receptacle each have a magnetic element. The magnetic element on one or both of the plug and receptacle can be a magnet, which is preferably a permanent rare earth magnet although electromagnets may also be used. The magnetic element on the plug or receptacle that does not include a magnet is composed of ferromagnetic material. When the plug and receptacle are brought into proximity, the magnetic attraction between the magnet and its complement, whether another magnet or a ferromagnetic material, maintains the contacts in an electrically conductive relationship.

This device is great for preventing accidental damage to a power cable and computing device and provides a successful means for supplying a single computerized unit with power and data, but this type of cable is not used for connecting two display units together magnetically. In the preferred embodiment of the present invention this or similar technology is directly integrated into our computerized units, such as iPads, tablets, mobile phones, etc., both for attachment purposes and/or for electrical signal transfer that does not require the use of an external cable unless desired.

The present invention will also provide the benefit of preventing damage to multiple devices if a cable is used to attach them. In the present invention when we do decide that it may be beneficial to connect two or more devices with a cable, both ends will have magnetic connectors, thus if one was to walk between them the cord would pull from one, the other, or both devices.

In computer hardware, a port serves as an interface between the computer and other computers or peripheral devices. Physically, a port is a specialized outlet on a piece of equipment to which a plug or cable connects. Electronically, the several conductors making up the outlet provide a signal transfer between devices. The requirements for cables to be used on computer display units have made it impossible to design a practical modular display system that provides uninterrupted content and that can quickly and easily be assembled in a very short period of time.

U.S. Pat. No. 7,841,776 entitled "Magnetic Connector with Optical Signal Path", to DiFonzo et al. ("DiFonzo"), describes circuits, apparatus, and methods that provide a connector system that can supply both power and data to a mobile computing or other type of device using a single connection. This invention will reduce the number of cables required for running a computer system in many instances, however it does not address any methods for joining one or more computer units together or a means for supplying more than one unit with power and data transfer.

Mobile computing devices have recently become popular for their portability, and as replacements for traditional computers, such as desktops. Many existing computing devices require numerous connections to the device; one for power and one for data transmission. These two connections generally require the use of cables that can be frustrating and quickly become unpleasant when the user trips or becomes entangled with one of these cables and accidentally pulls the laptop or device to the ground.

DiFonzo describes circuits, apparatus, and methods that provide a power and data transfer system that can supply both power and data to a laptop or other mobile computing device using a single connection. Again this patent application does not address any methods for joining one or more computer units together for display sharing or a means for supplying more than one unit with power and data transfer. This method is limited due to the fact that it can supply power and data transfer to only one device at any given time.

Rohrbach describes a Magnetic connector for electronic device. It comprises an electrical plug and receptacle relying on magnetic force to maintain contact. The plug and receptacle can be used as part of a power adapter for connecting an electronic device, such as a laptop computer, to a power supply. The plug includes electrical contacts, which are preferably biased toward corresponding contacts on the receptacle. The plug and receptacle each have a magnetic element. The magnetic element on one or both of the plug and receptacle can be a magnet, which is preferably a permanent rare earth magnet although electromagnets may also be used. The magnetic element on the plug or receptacle that does not include a magnet is composed of ferromagnetic material. When the plug and receptacle are brought into proximity, the magnetic attraction between the magnet and its complement, whether another magnet or a ferromagnetic material, maintains the contacts in an electrically conductive relationship.

Again this patent application does not address any methods for joining one or more computer units together for display sharing or a means for supplying more than one unit with power and data transfer.

SUMMARY OF THE INVENTION

The present invention describes a method of creating a modular computer. Described is a method of attaching a plurality of computerized units with integrated visual displays. It is designed for modularity and attached by magnetism. The computerized units incorporate at least one magnetic component for attaching to at least one other magnetic component on each additional unit.

The invention also provides a connector system that can transfer power and data to and from the computerized units. The units do not require cables to interact; however a cable is used for charging the units or if close proximity and modularity is not desired.

In one aspect, the invention includes a computer unit comprising a method for magnetically attaching one or more sides of said computer unit to one or more sides of one or more additional computer units, wherein the computer unit is a mobile tablet, a mobile phone, a laptop computer, a desktop computer, and/or a musical instrument effects unit.

In another aspect, the invention includes a computer unit comprising integrated ports, circuits, apparatus, and methods of transferring power and data with means capable of transferring said power and data directly from one device to another device without the necessity of a cable when the devices are brought together and coupled.

In another aspect, the connector system is a magnetic system comprising: a first connector integrated into a computer unit having a first plurality of electrical and power contacts and a plurality of magnets; and a second connector integrated into a computer unit having a second plurality of electrical and power contacts and a magnetic element, the second plurality of electrical and power contacts being adapted to mate with the first plurality of electrical and power contacts when the first connector couples to the second connector, wherein the plurality of magnets of the first connector integrated into a computer unit are proximally located and are arranged in opposing polarities with respect to each other so that when the first connector integrated into a mobile computer unit is brought in close proximity to the second connector integrated into a computer unit, magnetic field lines travel through the magnetic element of the second connector from one of the plurality of magnets in the first connector to another one of the plurality of magnets in the first connector, thereby increasing magnetic attraction between the first connector and the second connector.

In another aspect, the computer unit comprises circuits, apparatus, and methods capable of receiving power and data, and an integrated means of providing power and data output to one or more other computer units without the requirements for external cables and a means for each computer unit to be fixedly held to together.

In another aspect, the computer unit comprises the integration of one or more data splitters into the computerized unit.

In another aspect, the computer unit comprises the integration of one or more power splitters into the computerized unit.

In another aspect, the invention includes a computerized unit with integrated magnetic connector systems comprising: a first integrated connector comprising: a first plurality of electrical contacts, the first plurality of electrical contacts to mate with a second plurality of electrical contacts when the first connector couples to a second computerized unit with integrated connectors, wherein when the first integrated connector couples to the second integrated connector, the first and second plurality of electrical contacts define a corresponding plurality of electrical paths, wherein the plurality of electrical paths comprises at least one electrical power path and at least one signal path to convey a signal; and a magnetic element, the magnetic element to mate with a plurality of magnets in the second integrated connector that are proximally located and arranged in opposing polarities with respect to each other so that when the first integrated connector is brought in close proximity to the second integrated connector, magnetic field lines travel through the magnetic element of the first integrated connector from one of the plurality of magnets in the second integrated connector to another one of the plurality of magnets in the second integrated connector.

BRIEF DESCRIPTION OF DRAWINGS

FIG. 2—This figure shows a single modular display unit 4 that displays content very close to three sides, and then provides an example of what four units 5 attached together could look like.

DRAWINGS

Reference Numerals

Figure 1:
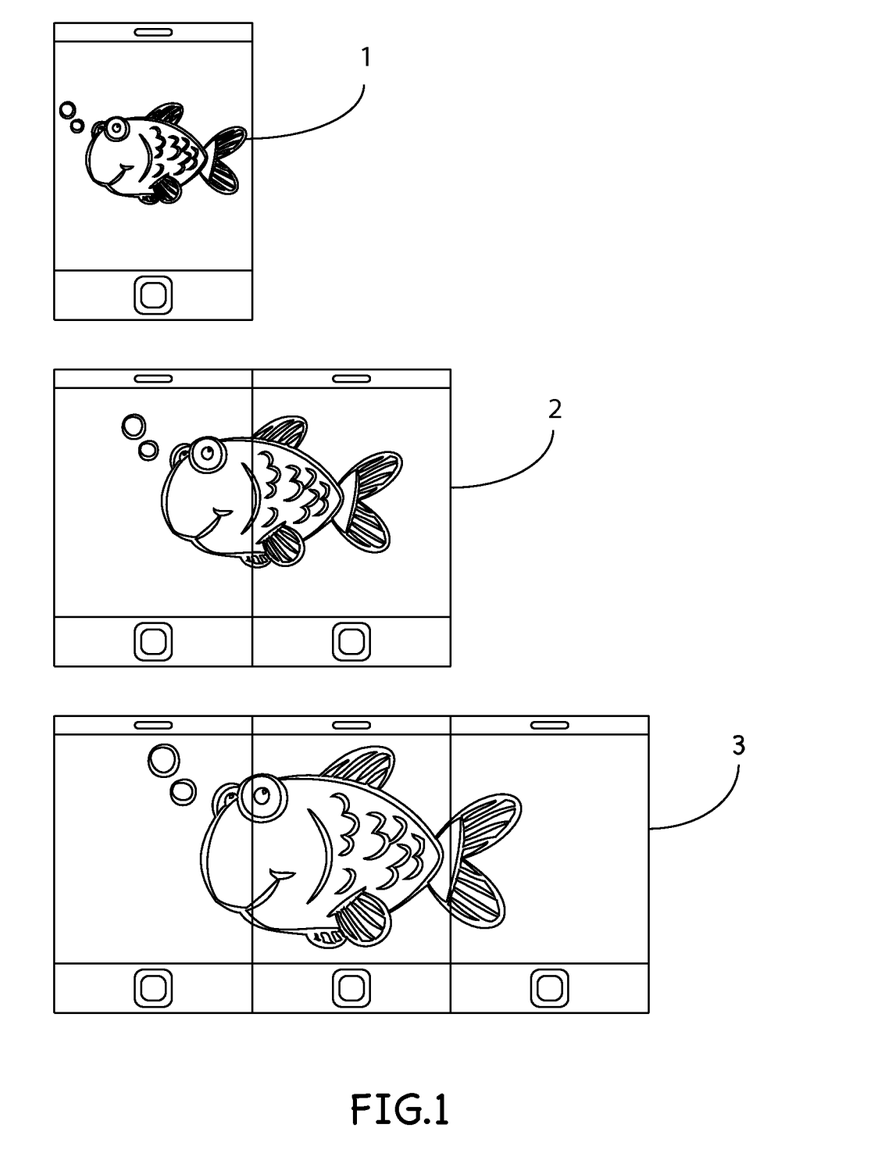
FIG. 1—This figure shows a single modular display unit 1 that displays content. It then provides an example of two modular units 2 attached together for the creation of a much larger screen and also three modular units 3 attached together for yet an even larger screen.
Figure 2:
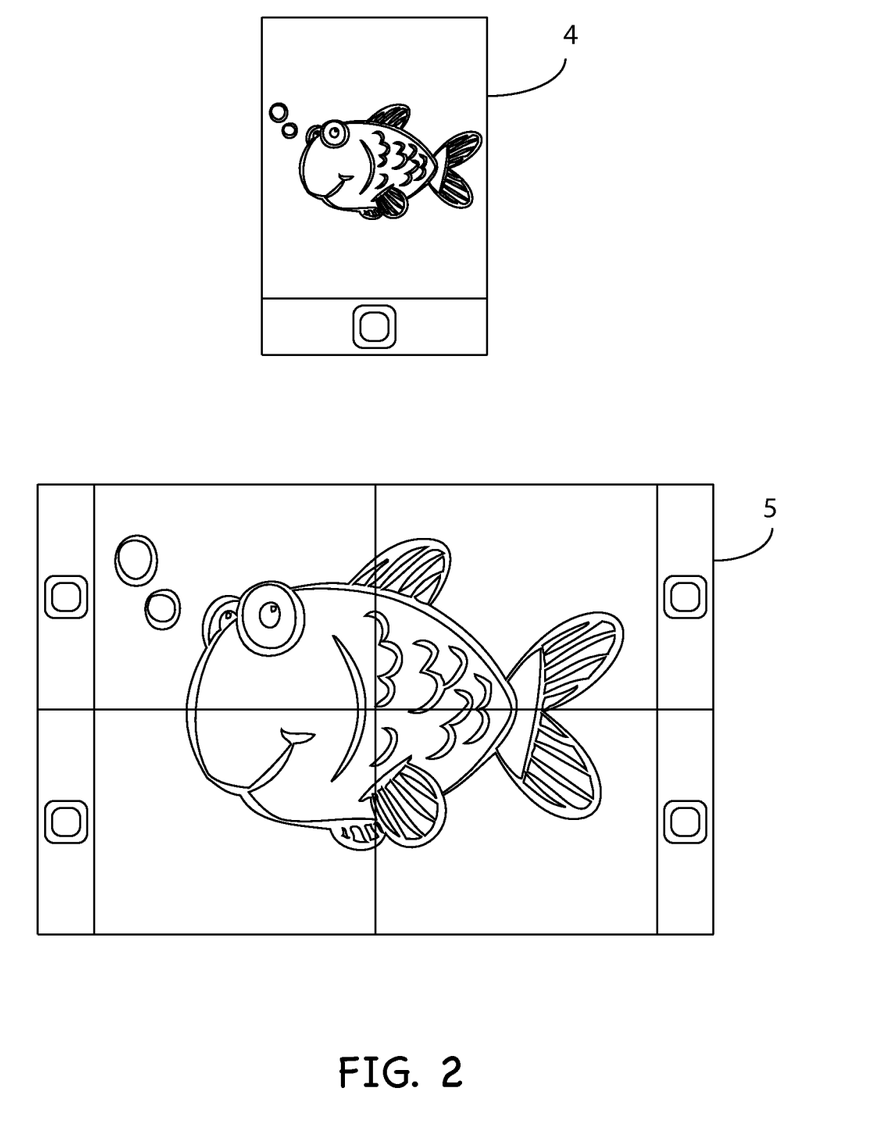
Figure 3:
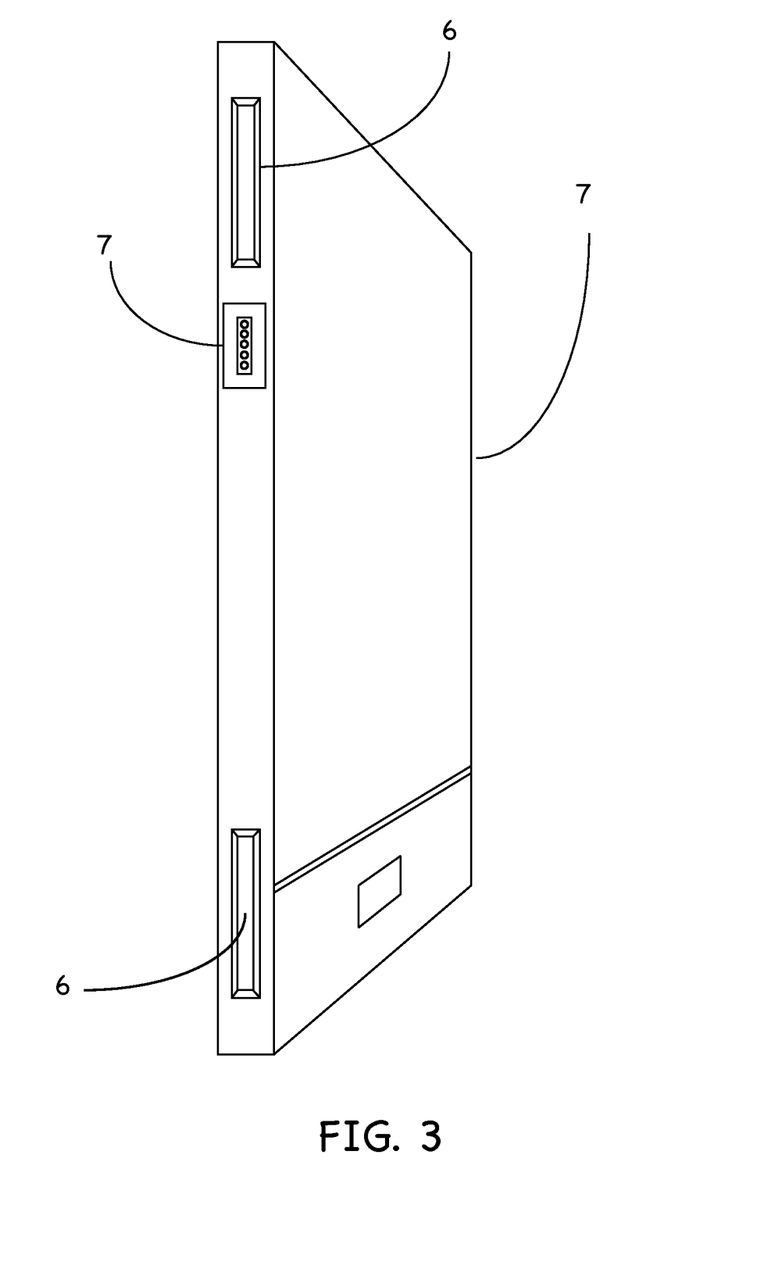
FIG. 3—This figure provides an example of where the magnets 6 may be positioned for attaching one device to another and illustrates a connector system 7 that can transfer power and data for a mobile computing device using a single connection.
Figure 4:
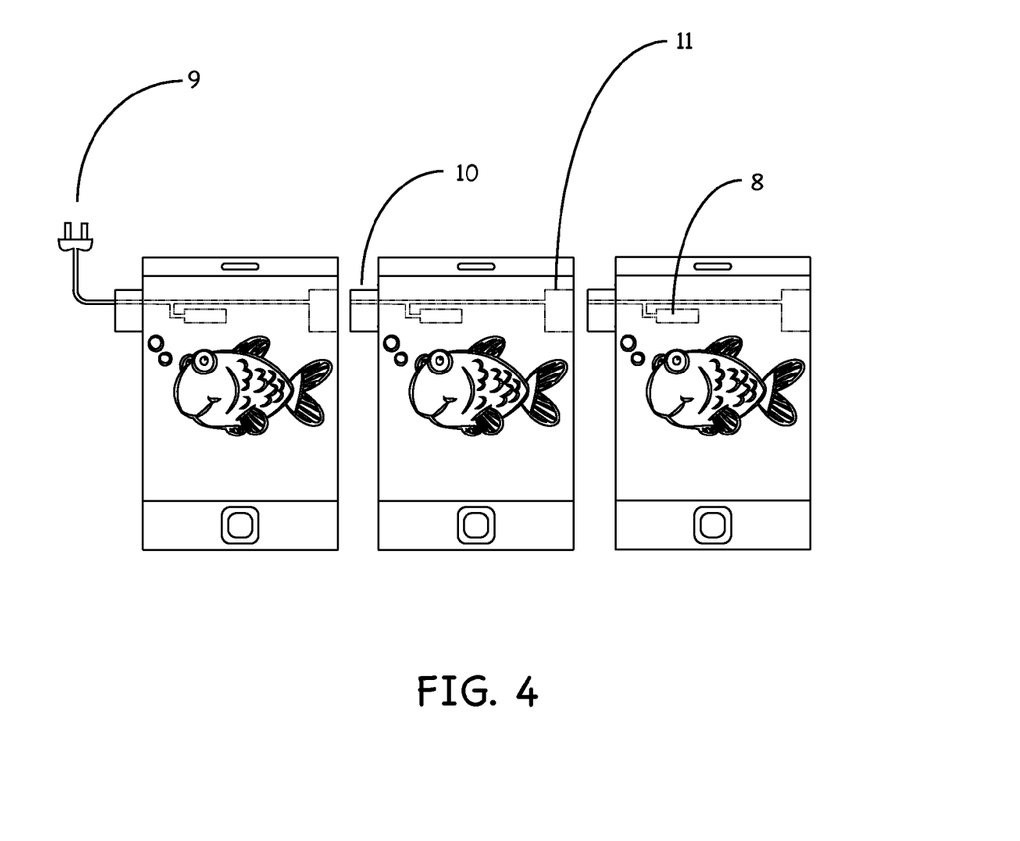
FIG. 4—This figure shows three computer display units each with the ability to send and receive electrical signals and power supplies to and from each other via integrated port systems 10, 11 that requires no cables, and includes battery, circuits and apparatus 8 for power and data splitting and a power adapter 9 with one magnetic end.
Figure 5:
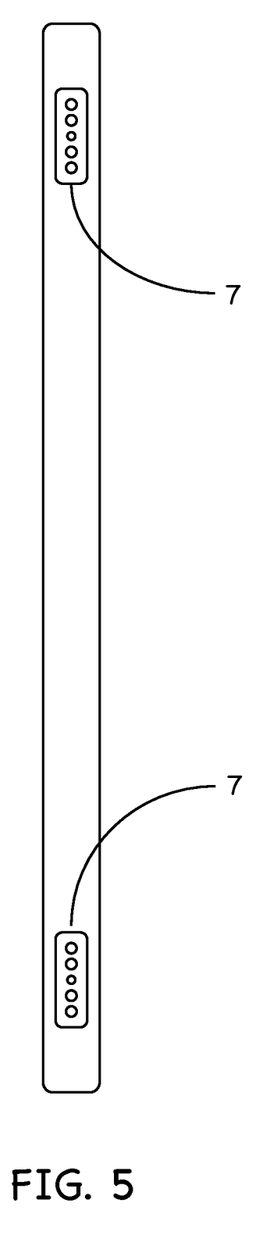
FIG. 5—This figure shows a side view of a connector system 7 that includes two data port power supply connectors.
Figure 6:
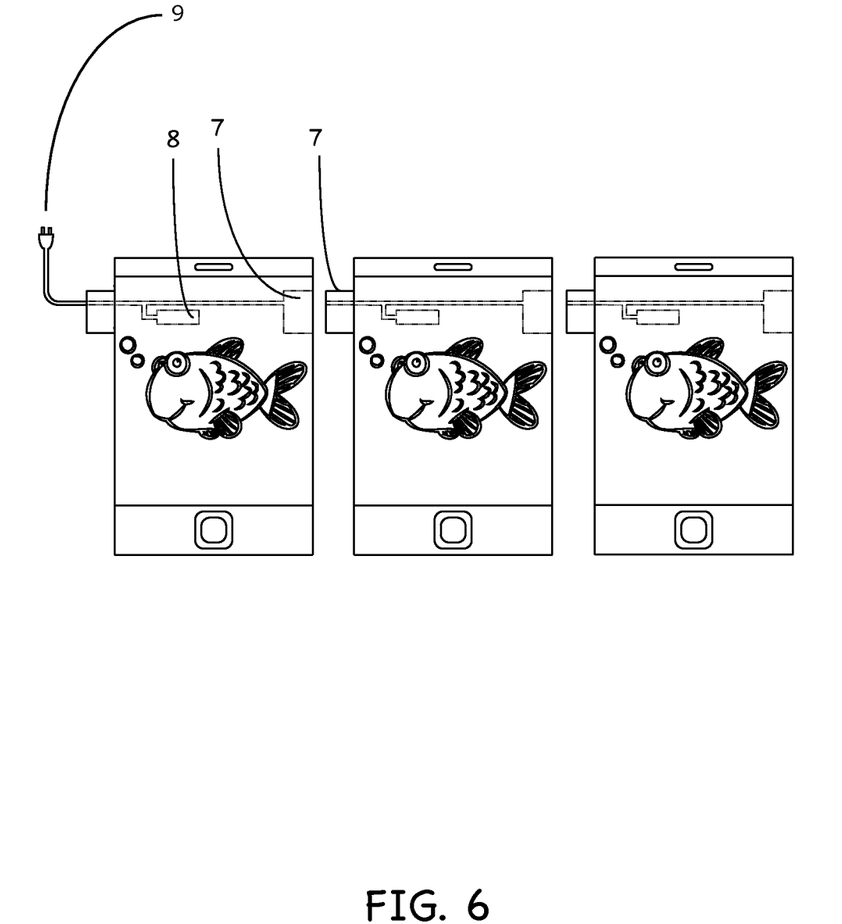
FIG. 6—This figure provides an example of how a splitter sends power or data to both an outgoing port and provides power and data to each unit, and includes a connector system 7, a battery, circuits and apparatus 8 for power and data splitting and a power adapter 9 with one magnetic end.
Figure 7:
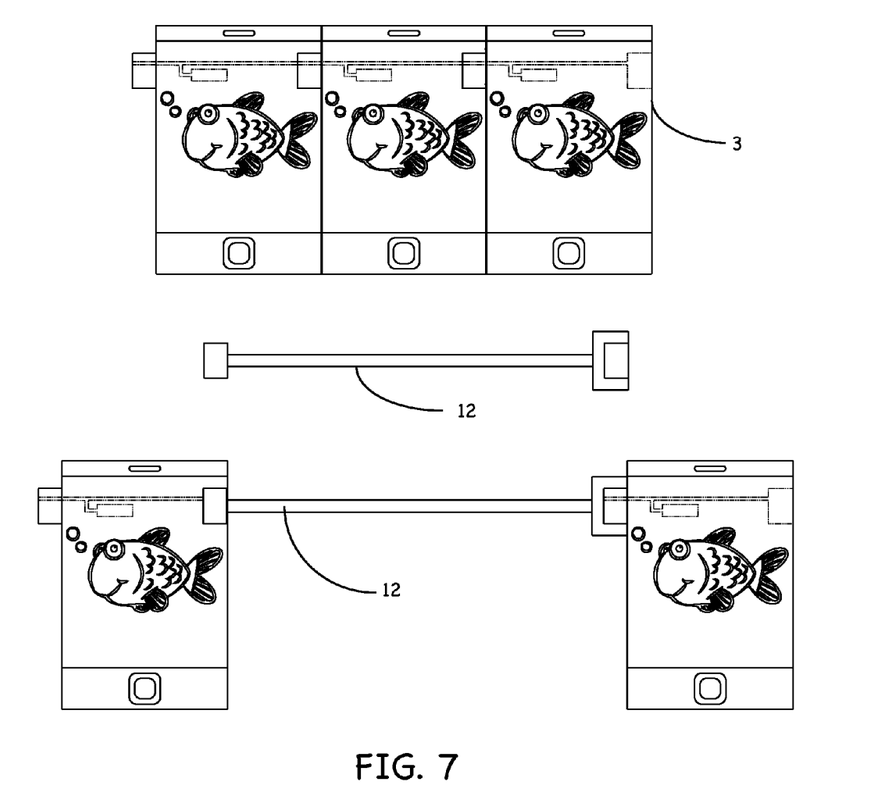
FIG. 7—This figure provides an example of how the system can be used with a cable 12 or as three modular display units 3 without a cable for attaching each additional unit.
Figure 8:
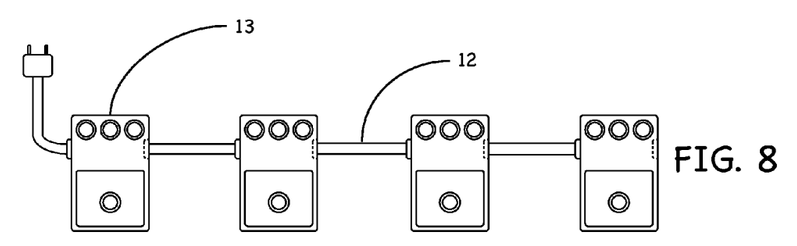
FIG. 8—This figure provides a picture of what a modular device that does not contain a visual screen could look like. In this picture we see a line of guitar pedals 13 attached in different ways described by the present invention, including a cable 12.
Figure 9:
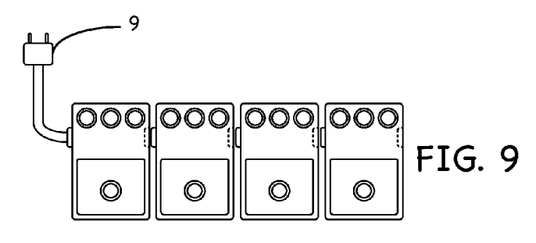
FIG. 9—This figure provides an example of the pedals being placed in proximity to each other about to be connected and including a power adapter 9.
Figure 10:
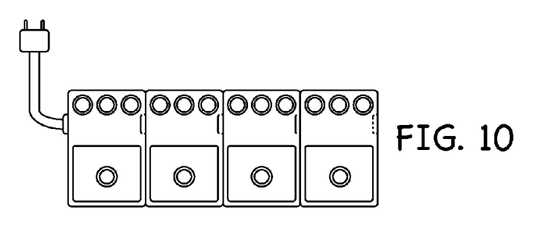
FIG. 10—This figure provides an example of the pedals connecting to each other without the need for cable attachments.
Figure 11:
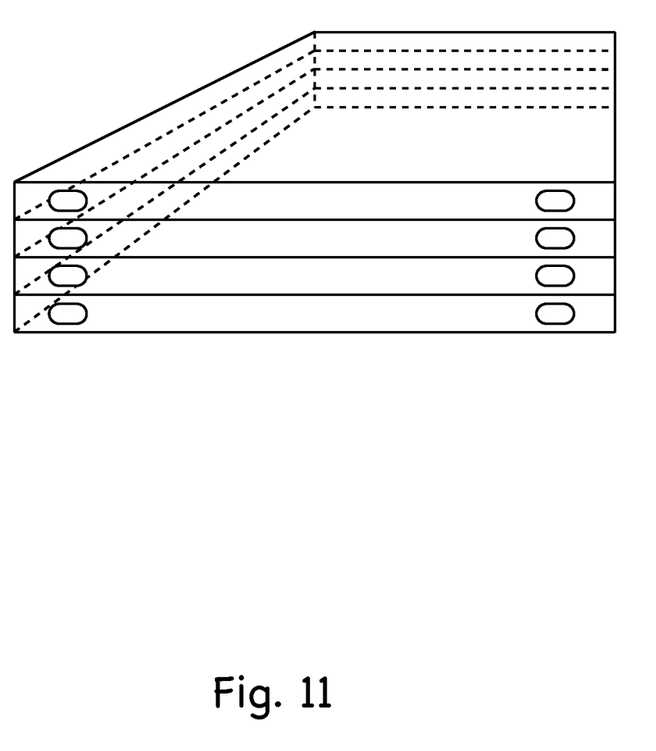
FIG. 11—This figure shows how four mobile computer units that were maybe being used as a substitute for a desktop computer can be stored on top of each other for easy transportation and/or storage. A 40 inch×10 inch (or 20 inch×20 inch)×0.25 inch system could be broken down to a 10 inch×10 inch×1 inch system for transport.

The attached drawings include the following features and corresponding reference numerals:

A single modular display unit 1 that displays content.
Two modular display units 2 attached together by magnetism.
Three modular display units 3 attached together by magnetism.
A single modular display unit 4 that displays content very close to three sides.
Four modular display units 5 being held together with magnetism.
A magnet 6 positioned in the device for attaching to another magnetic element positioned in another device, so that when the two are put in contact a magnetic force attracts the two separate devices.
A connector system 7 that can transfer power and data for a mobile computing device using a single connection.
Battery, circuits and apparatus 8 for power and data splitting.
Power adapter 9 with one magnetic end.
Integrated port system 10 with power and data input port.
Integrated port system 11 with power and data output port.
Cable 12 for non-modular attachment.
Musical Instrument effects pedal 13.

DETAILED DESCRIPTION OF A PREFERRED EMBODIMENT

In the preferred embodiment the present invention seeks to provide a computer unit that can be magnetically attached to another computer unit. This method of attachment is very useful as it creates the opportunity for two or more units to work as one. The units may be networked wirelessly or through a cable, but the preferred means of attachment is via magnetic connectors that are integrated into the units for both receiving and sending power and data. Integrating these connectors into the unit rather than using cables to connect one device to another creates a set of devices that can be easily assembled together and perceived as a larger device, which can be perceived as a practical replacement for desktop computing systems.

To provide an example, imagine a family of four that each has his or her own portable tablet devices with a screen 10×10 inches in size. Throughout the day they each take their device to work or school, however when they get home they connect their units and watch a movie together on a 40×10 (or 20×20) inch screen.

Another scenario is a group of three kids in the back seat of a car each with their own portable cellular phone unit. These screens are frequently too small to comfortably watch a video i.e. 2×5 inches, however if three units were connected to watch a movie on their long trip they could create a screen 6×5 inches in size, which would make the experience more enjoyable.

In the preferred embodiment of the present invention the modular display units will be integrated with one or more magnetically connecting ports that do not require cables. A cable will be used to supply a first device with power. These ports will transfer power, data and electrical signals, such as audio and visual content and will rely on magnetic force to maintain contact. These ports will also provide a superior method and platform for parallel computing, which could include bit-level, instruction level, data, task parallelism, clusters, MPPs, and grids.

In U.S. Pat. No. 7,841,776 B2 to DiFonzo et al. ("DiFonzo"), circuits, apparatus, and methods that provide a connector system that can supply both power and data to a mobile computing or other type of device using a single connection are described. In the preferred embodiment, analogous methods are used to transfer power and data. One of the main differences between the system described in DiFonzo and the present invention is that the ports in the present invention are integrated into the device, so that when brought into contact with one another they will magnetically attach and transfer electrical signals along with the power and data required for screen sharing, power and data splitting and audio/video content transfer.

The magnetic element on one or both of the integrated connecting ports can be a magnet, which is preferably a permanent rare earth magnet although electromagnets may also be used. The magnetic element on a port that may not include a magnet is composed of ferromagnetic material. When the electrical signaling transferring ports are brought into proximity, the magnetic attraction between the magnet and its complement, whether another magnet or a ferromagnetic material, maintains the contacts in an electrically conductive relationship.

Another element and benefit of the present invention is that only one electrical outlet is required to charge numerous devices if they are connected together. Power can flow through each unit, charge the batteries and run the unit. Power and data splitters are integrated into the computer units for power and data transfer to each additional unit. This avoids numerous cable requirements and will free up the power outlets that would have been required to charge and/or power each extra individual unit.

The BOSS guitar pedal company, which is owned by Roland Corp., has a system for their effects pedal units wherein a first tuner foot pedal is plugged into the wall, but each additional pedal is connected to the first by externally attaching two or three extra cables to each unit. Each additional pedal receives power from the outlet through the tuner pedal, which can supply power for up to seven BOSS compact effects pedals. The present invention improves upon this system by integrating both the male and female connecting ports into the computerized devices so that no cables are required. The present invention also provides a means to securely hold the units together through magnetism. Also in the present invention each unit will contain a battery for storing power.

Another element of the present invention is the collection of circuits, apparatus, and methods that provide a power and data transfer system that can supply both power and data to more than one computerized unit or mobile computing device. This can be achieved using only a single connection. Sharing or splitting the data and power signals achieves this. As an example it is common in the art to split a signal to deliver content or power to more than one device. In the present invention power and data are delivered to a first computerized unit using methods found in the art that include circuits, apparatus, power and data splitters, but also includes a method for sending power and data to one or more outgoing ports of each computerized unit such that when a second computerized unit is attached to the first, power and data are supplied to the second, third, fourth, fifth, etc. units as well. This cycle continues, as each device is equipped with one or more incoming and outgoing data and power ports.

In the preferred embodiment a connecting system such as that found in DiFonzo will be used to supply the present invention with data and power, however in addition to this, numerous data splitters and power dividers will be built into the computerized unit to enable it with the ability to supply one or more additional computerized devices with power and data from the first, second, third, etc.

Some of the main innovative elements of the present invention provided in this modular computerized unit include:

1. The ability of the unit to magnetically attach to another similar or identical unit.
2. The integration of both male and female ports into the unit so that when two or more units are attached side by side the ports become functional and do not require external cables.
3. The integration of one or more data splitters into the computerized unit.
4. The integration of one or more power splitters into the computerized unit.
5. The ability to charge more than one computerized unit with only one cable attachment.
6. The ability to share data quickly and easily between more than one computerized unit without the necessity of cables, Wi-Fi or through the air transmission methods.
7. The ability to provide a superior platform for numerous methods of parallel computing.

ALTERNATIVE EMBODIMENTS

In alternative embodiments the methods of the present invention will also be used for attaching desktop and laptop style computers together as well as digital display signage for things such as advertising campaigns and roadside digital screens and the like.

In yet another alternative embodiment of the present invention the described modular attachment method will be used in the attachment of musical instrument effects pedals. By providing musical instrument effects pedals with an integrated power and data transferring system that uses magnetism for attachment and does not require external cables the set-up of a system of effects units for musical instruments can more easily and neatly be achieved.

As an example we could have a tuner pedal that is plugged into an electrical outlet powering itself and also delivering a power supply for each additional pedal. In this alternative embodiment the additional pedals are magnetically attached to each additional pedal in the line and are fitted with the ability to use the power and data for their own operation and also to transfer power and data into each additional unit for the purpose of supplying the additional units with power and data and so on.

Effects units are electronic devices that alter how a musical instrument or other audio source sounds. Some effects subtly "color" a sound, while others transform it dramatically. Effects are used during live performances or in the studio, typically with electric guitar, keyboard and bass. While most frequently used with electric or electronic instruments, effects can also be used with acoustic instruments, drums and vocals. Examples of common effects units include wah-wah pedals, fuzzboxes and reverb unit.

In another alternative embodiment the magnetic components that hold the units together will be separate from the locations where power and data transfer occur. This means that magnets will hold the devices in a desired position, but that the contacting components of the ports for data and power transfer may occur elsewhere on the device.

In yet another alternative embodiment one or more cables are provided to each unit so that in instances when it is not desired to have the units located directly side by side, but it is desired to maintain a connection the ports of the present invention offer up both possible options. This cable would be capable of receiving outgoing power and/or data and would also be capable of delivering incoming power and/or data to the computerized units.

I claim:

1. A system of computer units with integrated magnetic connectors, comprising:
   a first integrated connector comprising a first plurality of electrical contacts in a first instrument effects device focused on audio processing, the first plurality of electrical contacts adapted to mate with a second plurality of electrical contacts in a second instrument effects device focused on audio processing when the first integrated connector couples to a second integrated connector in the second instrument effects device with integrated connectors, wherein when the first integrated connector couples to the second integrated connector, the first and second plurality of electrical contacts define a corresponding plurality of electrical paths; and
   a magnetic element adapted to mate with a plurality of magnets in the second integrated connector that are proximally located and arranged in opposing polarities with respect to each other so that when the first integrated connector is brought in close proximity to the second integrated connector, magnetic field lines travel through the magnetic element of the first integrated connector from one of the plurality of magnets in the second integrated connector to another one of the plurality of magnets in the second integrated connector;
   wherein the plurality of electrical paths comprises at least one signal path to convey a signal, and wherein when the first integrated connector and second integrated connector are magnetically coupled, the at least one signal path transfers instrument effects information from the first device to the second device without use of a cable between the first device and the second device.

2. The system of claim 1, further comprising:
   a first power port integrated into the first plurality of electrical contacts; and
   a second power port integrated into the second plurality of electrical contacts;
   the plurality of electrical paths comprising at least one electrical power path;
   wherein when the first power port and the second power port are brought into physical contact, the first device is adapted to transfer power to the second device to charge the second device without use of a cable between the first device and the second device.

3. The system of claim 2, the first device being adapted to power the second device without use of a cable between the first device and the second device.

4. The system of claim 2, further comprising:
   a battery for powering the second device and for receiving the power transferred from the first device to the second device to charge the second device.

5. The system of claim 1, further comprising:
   a first power port integrated into the first plurality of electrical contacts; and
   a second power port integrated into the second plurality of electrical contacts, the plurality of electrical paths comprising at least one electrical power path, wherein when the first power port and the second power port are brought into physical contact, the first device is adapted to power the second device without use of a cable between the first device and the second device.

6. The system of claim 1, the first instrument effects device being coupled to a power source for powering the first instrument effects device.

7. The system of claim 6, further comprising:
   a cable connecting the first instrument effects device to the power source.

8. The system of claim 1, at least one of the first instrument effects device and second instrument effects device comprising a foot-operated instrument effects device.

9. The system of claim 8, at least one of the first instrument effects device and second instrument effects device comprising an instrument effects pedal.

10. The system of claim 1, further comprising:
    a visual display integrated into at least one of the first instrument effects device and second instrument effects device.

11. A transfer system for transferring data to a second device from a first device, comprising:
    the first device coupled to a data source via a hardwired connection for sending data to and receiving data from the Internet;
    a magnetic connector assembly having a first connector in the first device having a first data port, and a second connector in the second device having a second data port, at least one of the first and second devices being an instrument effects device focused on audio processing, the first and second connectors being releasably coupled by magnetic attraction;
    a first power port integrated into the first connector in the first device; and
    a second power port integrated into the second connector in the second device;
    wherein when the first and second connectors are magnetically coupled, the first data port and the second data port are brought into communication with one another to transfer data between the first device and the second device without use of a cable between the first device and the second device, thereby sharing the hardwired data connection of the first device with the second device; and
    wherein when the first and second connectors are magnetically coupled, the first power port and the second power port are brought into communication with one another for power transfer from the first device to the second device to charge the second device without use of a cable between the first device and the second device.

12. The transfer system of claim 11, the hardwired data connection including a fiber optic cable.

13. The transfer system of claim 11, further comprising:
    a visual display integrated into at least one of the first instrument effects device and second instrument effects device.

* * * * *